(12) United States Patent
Butterfield et al.

(10) Patent No.: US 6,237,697 B1
(45) Date of Patent: May 29, 2001

(54) QUICK RELEASE AND STORAGE SYSTEM BASED ON AN ECCENTRIC ROTATING ELEMENT

(75) Inventors: Robert Butterfield; Gerard F. J. Bourgault, both of St. Brieux (CA)

(73) Assignee: Bourgault Industries, Ltd. (CA)

( * ) Notice: Subject to any disclaimer, the term of this patent is extended or adjusted under 35 U.S.C. 154(b) by 0 days.

(21) Appl. No.: 09/356,141

(22) Filed: Jul. 19, 1999

(30) Foreign Application Priority Data

Feb. 6, 1999 (CA) .................................................. 2273461

(51) Int. Cl.[7] .................................................. A01B 15/16
(52) U.S. Cl. ............................................. 172/566; 172/558
(58) Field of Search ........................... 111/163–169, 185, 111/192, 189, 190; 172/572, 566, 573, 570, 599, 558, 26

(56) References Cited

U.S. PATENT DOCUMENTS

| | | | |
|---|---|---|---|
| 4,333,535 | 6/1982 | Hentrich, Sr. ......................... | 172/572 |
| 4,574,715 | 3/1986 | Dietrich, Sr. et al. ................... | 111/7 |
| 4,883,126 | 11/1989 | Leland .................................. | 172/26 |
| 5,234,060 | 8/1993 | Carter ................................... | 172/413 |
| 6,024,179 | 2/2000 | Bourgault ............................. | 172/566 |

*Primary Examiner*—Robert E. Pezzuto
(74) *Attorney, Agent, or Firm*—Michael Best & Friedrich LLP

(57) ABSTRACT

Disk coulters are used on numerous soil engaging farm implements to cut furrows into which seed or fertilizer can be deposited. Disk coulters may also be used to cover furrows or simply cut trenches in the land. Typically, an implement or tool bar frame may have several disk coulter assemblies attached to the frame. Some are dedicated to inserting seed into the soil and other fertilizer. In an alternate configuration, the implement or tool bar may have a combination of shanks and coulters. In any given application it may not be necessary to use some of the coulter disks assemblies. Because of the wear on coulters as they move through the soil and encounter rock and other debris, it is advantageous to be able to quickly lift some of the coulter disks out of the soil while operating with other disks. The present invention provides an eccentric rotating element attached to a spring which generally in operation exerts force upwardly on the coulter arm and therefore maintains the coulter in a downward position. By rotating this eccentric rotating element the spring may be released and the coulter disk raised, by hand, off the ground and thereafter locked in place with a spacer element. With the present invention the operator can easily lift or lower coulters in the midst of a seeding operation.

26 Claims, 16 Drawing Sheets

QUICK RELEASE AND STORAGE SYSTEM BASED ON AN ECCENTRIC ROTATING ELEMENT

FIELD OF THE INVENTION

The present invention relates to agricultural implements and more particularly to cultivating implements employing coulter disk assemblies mounted on a tool bar.

BACKGROUND

Disk coulters are used in a multitude of farm applications. One such application is to use disk coulters as part of an assembly, to cut a slot in the soil to provide an area within which seed or fertilizer can be deposited.

A coulter assembly has a number of wearing parts which gradually deteriorate in direct proportion to the number of acres of ground engagement. These generally include all the parts which contact the soil plus any bearings, bushings or pins located in any and all pivot points. The disk coulters also require significant force to pull them through the ground and create soil disturbance. Since the same implement can be used to seed different crops, it is not always necessary to have all of the disk coulters which are mounted on the tool bar frame of an implement, to engage the ground at all times. For example, if a tool bar is equipped with separate disk coulters for seed and fertilizer and the farmer wishes to seed a crop which does not require fertilizer, it is advantageous to disable the fertilizer disk coulters and remove them from contacting the ground.

It is therefore an object of the present invention to have a coulter assembly which can be disengaged and lifted from contact with the ground and similarly to be restored to ground engagement for other applications.

It is also an object of the present invention to create a device by which an operator can quickly and easily disengage the coulter from the ground while in a field setting, without requiring undoing nuts and bolts and using other special tools.

SUMMARY OF THE INVENTION

Very briefly, the present invention provides a quick release and lock up system for taking a coulter type assembly out of contact with the ground and locking it securely in a disabled or raised position. The principle upon which the quick release and lockup system functions is by releasing the spring load which normally forces the disk coulter into the ground. The spring is then detached and the coulter disk pivotally raised out of contact with the ground by the operator. Thereafter a block is inserted by the operator, to prevent the disk coulter from falling back onto the ground. The spring is then reattached to apply force to keep the system locked together and in place.

The system includes an eccentric type of rotating element assembly with a stub torque arm into which a lever may be inserted. The stub torque arm projects radially outward of the two disks. A pivoting attachment receptacle which is connected to a threaded eye-bolt is used. A combination spacer and extension block effectively extends the reach of the spring for reattachment after the disk coulter has been raised and the spacer block inserted.

As previously mentioned, the basis of the invention is that of using an eccentric type of rotating element for extending or releasing the spring so that the disk coulter can be pivoted upward and removed from contact to the ground. In the working position, the eccentric rotating element brings the spring attachment pivot point passed the geometric centre of the rotating element, to bias the element such that it tries to rotate the radially extending stub torque arm against the stop bracket. In this case the stop bracket is used to prevent the rotation from continuing in the biased direction and also used to guide the spring element eye-bolt and serve as a pivot platform for the eccentric rotating element. A lever, which attaches to the radially extending torque arm on the eccentric rotating element, is used by an operator to rotate the eccentrically rotating element to stretch or release the spring as required.

To secure the disk coulter assembly in the raised position, the combination spacer block and spring extension bracket is inserted into the assembly and the spring is restretched with the spring force securing everything into its proper place.

In an alternative embodiment a simple pin or other solid element can be used to hold the coulter in a raised position, when the eccentric element produces more linear travel a pin is inserted through a hole in the mounting bracket. There is a matching hole in the strut. The extension is then not required. When the eccentric element is in a lever down position the strut is biased and held securely against the mounting bracket by the pin.

BRIEF DESCRIPTION OF THE DRAWINGS

The invention will be described more fully in conjunction with the drawings, wherein.

DETAILED DESCRIPTION OF THE DRAWINGS

Figure 1:
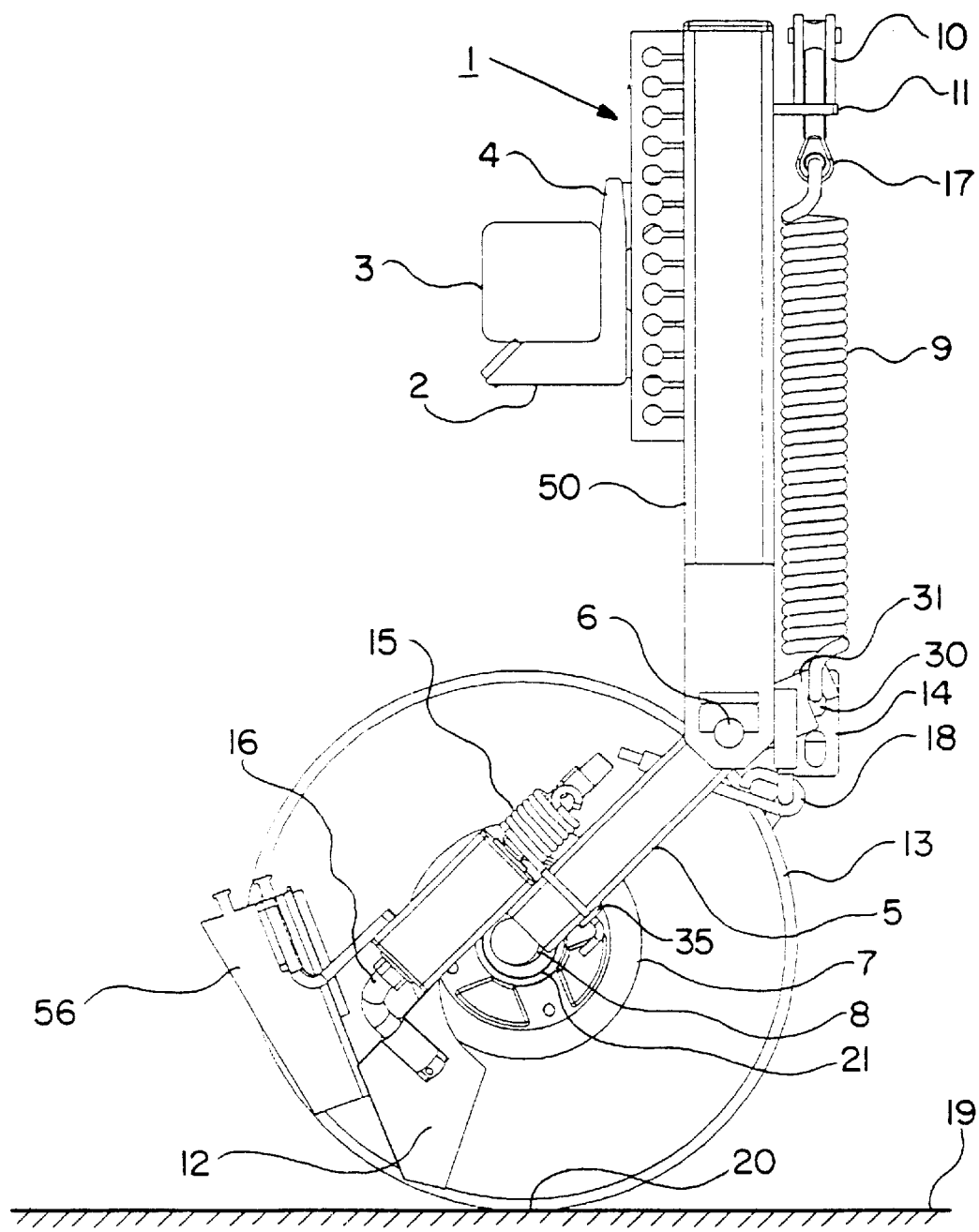
FIG. 1 is a side view of the inboard side of a coulter disk assembly in the operating position.

FIG. 1 is a side view of a coulter assembly of the present invention looking at the inboard side of the coulter disk. The upper portion of the assembly includes a mounting bracket generally shown as 1. The components will be described in greater detail in later drawings.

Attached to the mounting bracket 1 is an attaching bracket 2. The attaching bracket is bolted to the mounting bracket 1. The attaching bracket 2 attaches around a tool bar frame member 3 of a cultivator or some other farm implement pulled by a power source. As shown more clearly in FIG. 4, a U-bolt 4 encircles the tool bar frame member 3 to secure it to the attaching bracket 2. A lower strut generally shown as 5 is pivotally attached to the mounting bracket 1 at point 6. A bolt or pin may be used as a pivot.

A disk coulter 13 is attached to a mounting hub 7. The mounting hub 7 is adapted to rotate about a spindle 8 by using bearings (not shown) in a conventional manner. The spindle 8, is fixedly attached to the strut 5.

To maintain the coulter disk 13 in contact with the ground 19, an extension spring 9 is used. The spring is attached at its upper end to an eye-bolt 17 which extends upwardly through a tab 11 located on mounting bracket 1. To the upper portion of the eye-bolt is attached the eccentric element 11, which will be discussed later in detail. The bottom end of the spring 9 is attached to a hook at point 30, which is located on an outboard arm 31, fixedly attached as a component of strut 5. The disk coulter 13 is equipped with a scraper 12 on the inboard side. The scraper 12 is mounted on a torque transmitting arm 16 which is tensioned by a torsion spring 15.

In FIG. 1, when the coulter 13 is in the operating, ground engaging position, the combination extension spacer block 14 is simply stored hanging upon the end of spring 9. The threaded eye-bolt 18 as shown in FIG. 1 or a J-bolt 18a as shown in FIG. 2 engages a scraper tine 26 which cleans the outside or outboard side of the coulter disk 13.

The coulter disk 13 engages the ground at point 20, as shown in FIG. 1. However, it is to be understood that generally the coulter disk not only engages the ground, but actually turns below the surface 19 creating a furrow. On the inboard side of the coulter disk, spindle 8 and bearings (not marked) are covered with a seal 21 to prevent dirt from entering into the bearing and spindle assembly.

Figure 2:
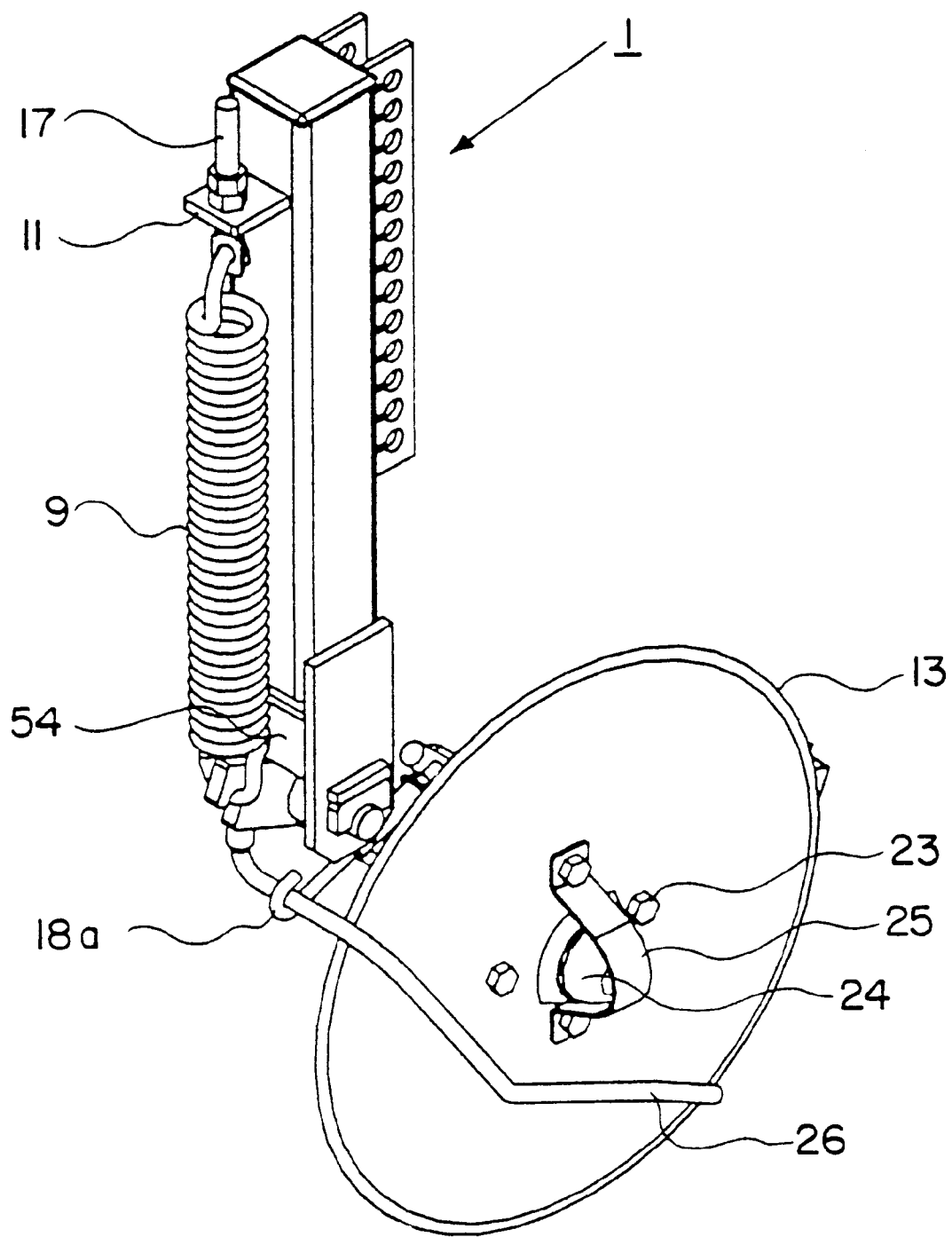
FIG. 2 is a prospective view of the outboard side of a coulter disk assembly without the features of the present invention.

As is more clearly shown in FIG. 2, bolts 23 secure the mounting hub shown in FIG. 1 to the coulter disk 13. The outboard side of the coulter disk has its spindle 8 covered with a dust cap 24. A dust shield 25 protects the dust cap from damage from rocks or other debris.

It is to be noted that the coulter disk assembly shown in FIG. 2 does not have the eccentric rotating element 10 of the present invention as the eye-bolt 17, which is attached to the top of the spring 9 is simply affixed to a tab 11 by means of nuts 22.

Figure 3:
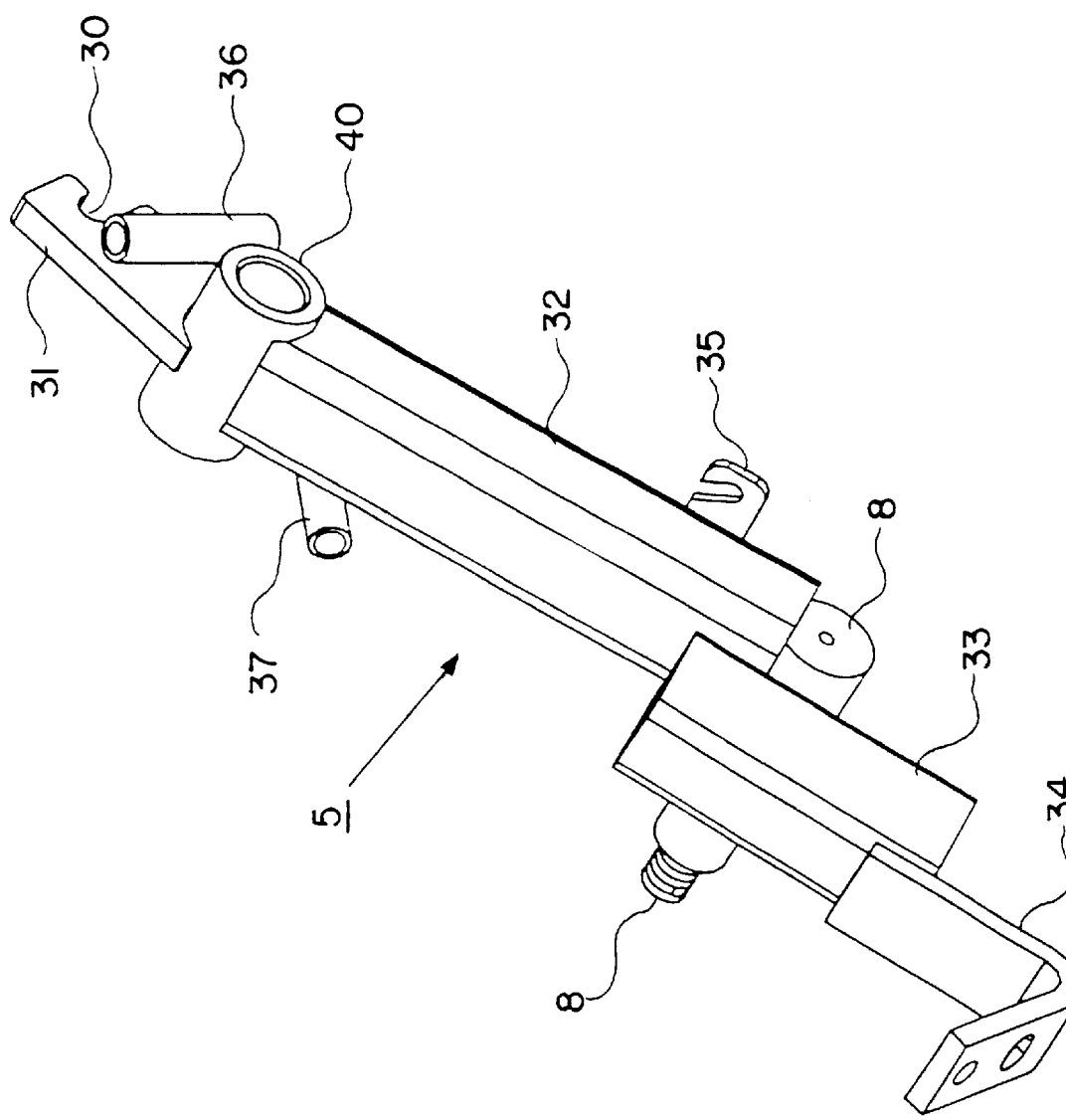
FIG. 3 is a prospective view of the strut and the various components which are fixedly attached to produce the strut.

FIG. 3 is a detailed view of the components of the strut 5. All of these components are welded and fixedly attached to one another. Strut 5 is comprised of an outboard arm 31 which is welded to a pivot bushing 40 at an oblique angle to the inboard arm 32. The spindle 8 is welded to the lower end of the inboard arm 32. Also welded thereon is a torque transmitting arm mount 33 which basically houses the torque transmitting arm 16 of the scraper 12.

A crop input depositing tube mount 34 is welded near the bottom of the torque transmitting arm mount 33. A torsion spring attachment tab 35 is welded onto the side of inboard arm 32 and is adapted to secure the end of the torsion spring 15 which is used to exert force upon scraper 12. Pivotable scraper tine mount 36 is welded on outboard arm 31 and is used to secure the upper end of outboard side scraper tine 26.

Eye-bolt or J-bolt mount 37 is welded on the lower inboard arm at the opposite side and is adapted to secure the eye-bolt 18 or J-bolt 18a which essentially holds scraper tine 26. Pivot bushing 40 is adapted to pivot about the point 6, shown in FIG. 1.

Figure 4:
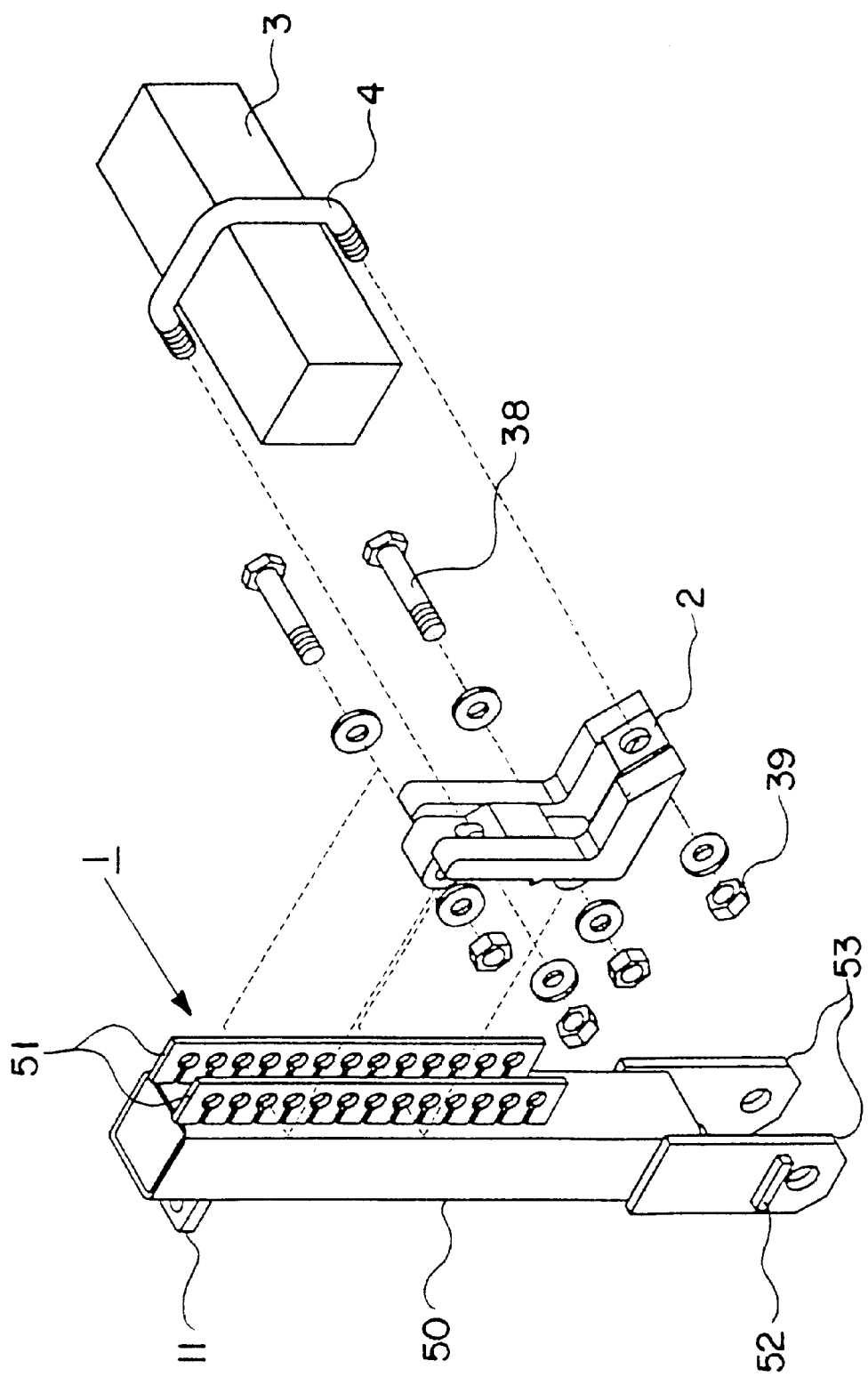
FIG. 4 is a detailed exploded view of the components which make up part of the mounting bracket and components used to attach the mounting bracket to a tool bar frame member.

An examination of FIG. 4 reveals the components of the mounting bracket 1. As shown, the mounting bracket 1 consists of a rectangular tube 50 equipped with a number of multi-hole tab brackets 51. Thus, the attaching bracket 2 can be mounted through the multi-hole tabs at a height desirable to the operator and for the operation for which he is about to engage in, i.e. by using multi-hole tabs 51 various positions of penetration in the ground of the coulter 13 are predetermined. Bolts 38 and nuts 39 secure the attaching bracket to the mounting bracket 1.

As was previously mentioned, U-bolt 4 secures attaching bracket 2 to a tool bar frame member 3 of a ground engaging implement. At the bottom of tube 50 are welded a pair of tabs 53 which have apertures adapted to hold a pivot pin, not shown, which is secured through pivot bushing 40.

Figure 5:
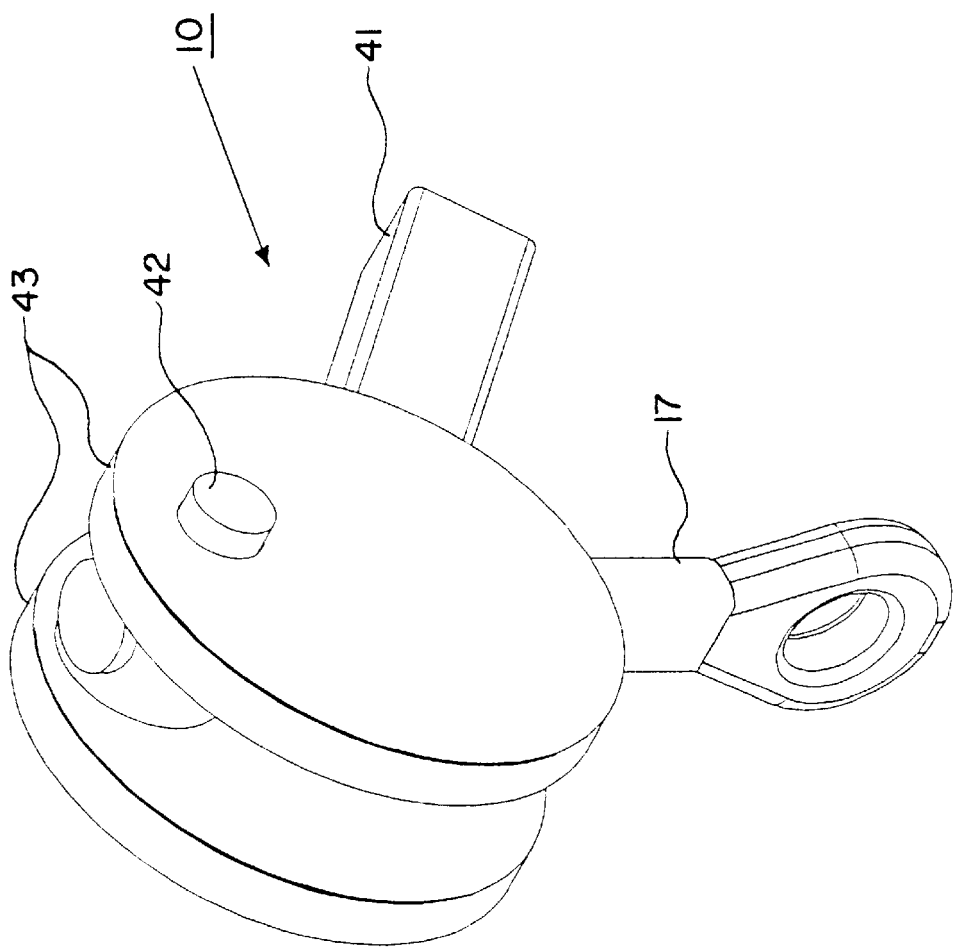
FIG. 5 is an enlarged prospective view of the eccentric rotating element.
Figure 6:
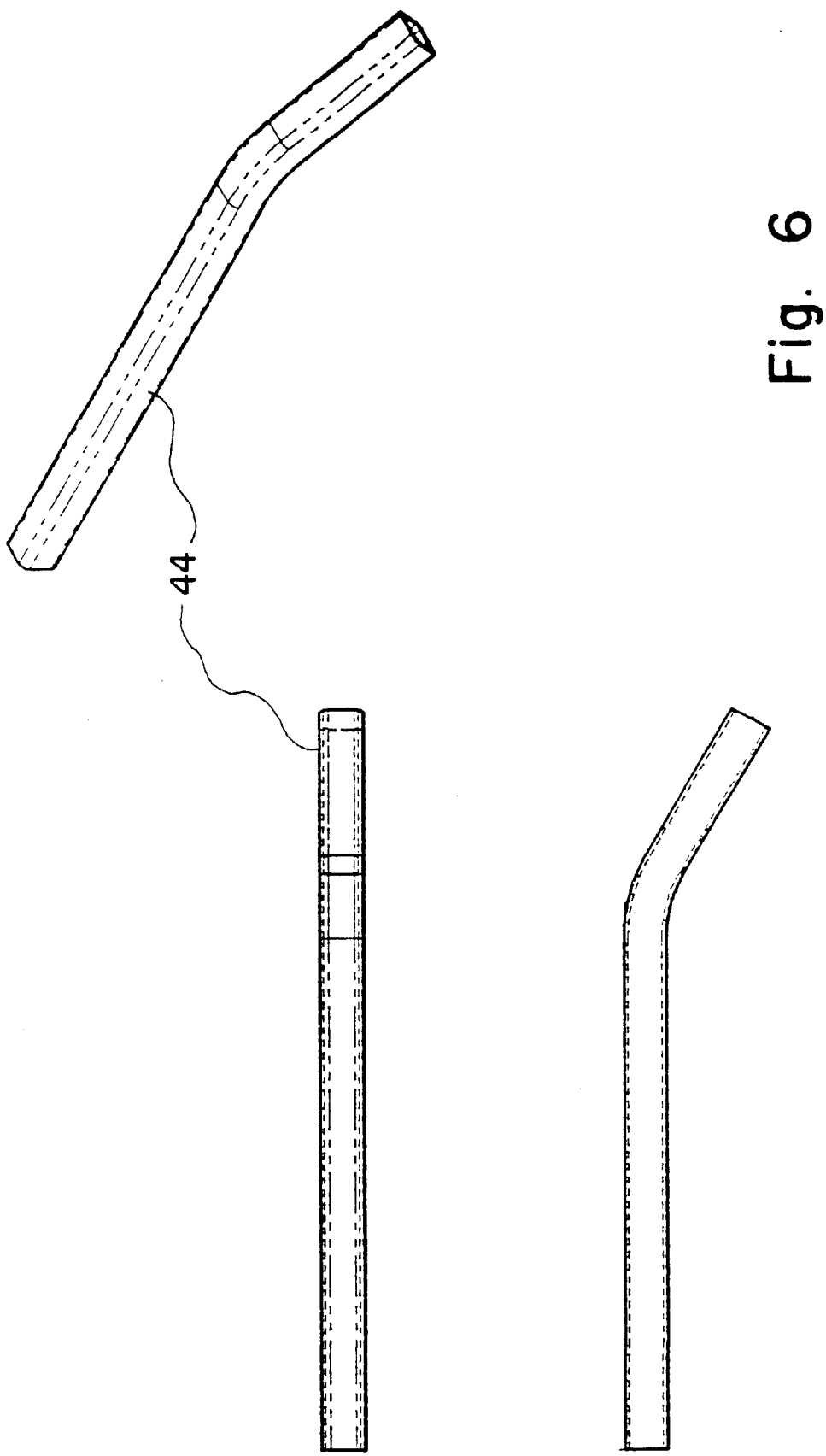
FIG. 6 is a number of side views of the lever arm.

In FIG. 5 the eccentric element 10 is shown in greater detail. Two disks 43 are connected by an off-center pivoting connector 42. A torque arm 41 is adapted to receive a lever 44. The lever 44 is shown in detail in FIG. 6. Eye-bolt 17 which as previously mentioned connects the top of spring 9 and is securely fastened to pivoting connector 42.

Figure 9:
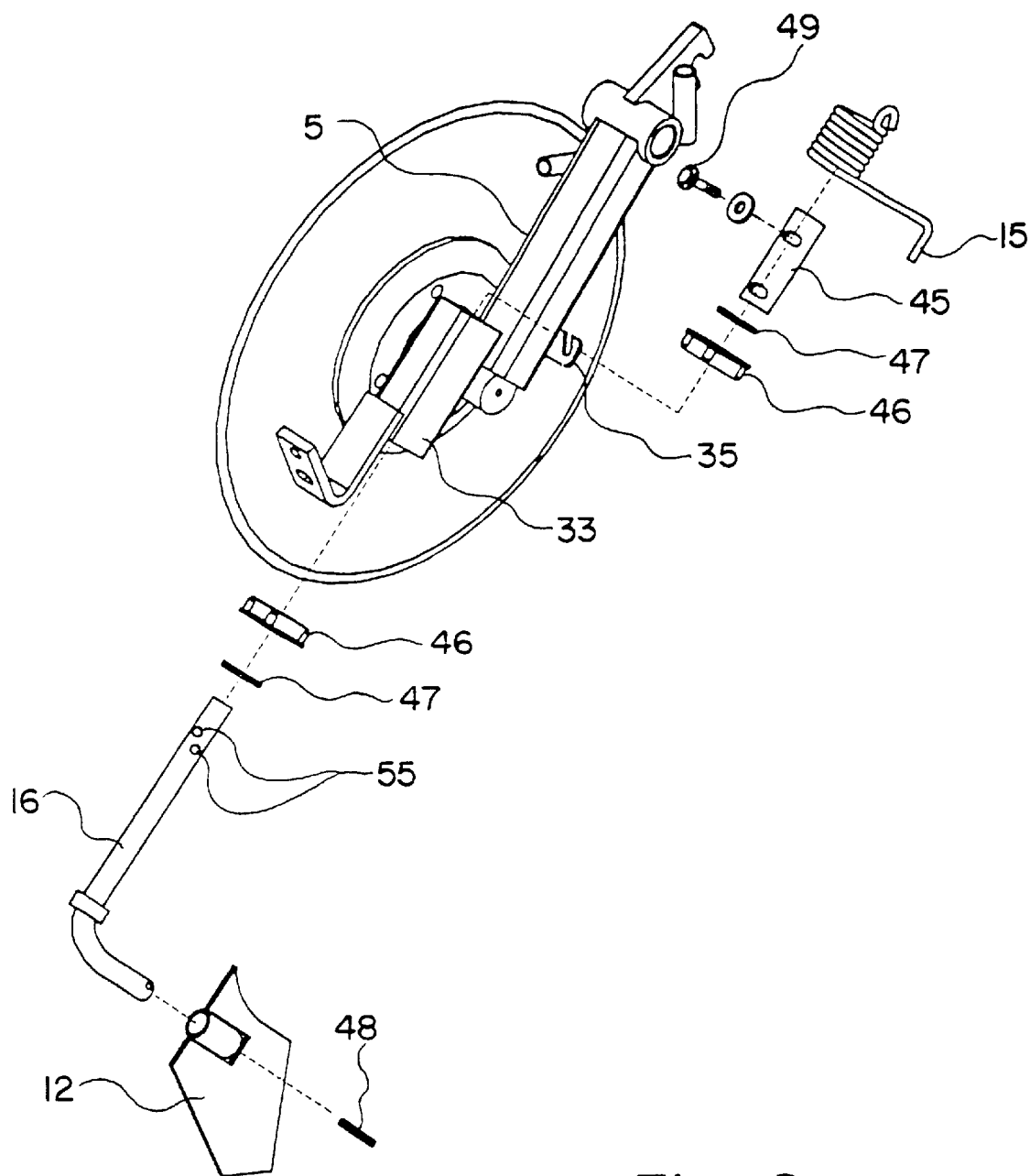
FIG. 9 is an exploded view of the scraper assembly components.

Turning briefly to FIG. 9, one sees the various components of the scraper assembly. The torque transmitting arm 16, as previously mentioned, is adapted to hold the scraper 12. A retaining pin 48 is used to hold the scraper 12 on torque transmitting arm 16. A spacer 45 is mounted within the torsion spring 15 by a torque transmitting arm bolt 49. Washers 47 and pivot blocks 46 secure the torque transmitting arm within torque transmission arm holder 33. Torque transmitting arm 16 is equipped with a pair of apertures 55 at its upper end for selecting different spring forces. Finally, as shown in FIG. 1, a granular products depositing tube 56 can be mounted on crop input depositing tube mount 34.

Figure 10:
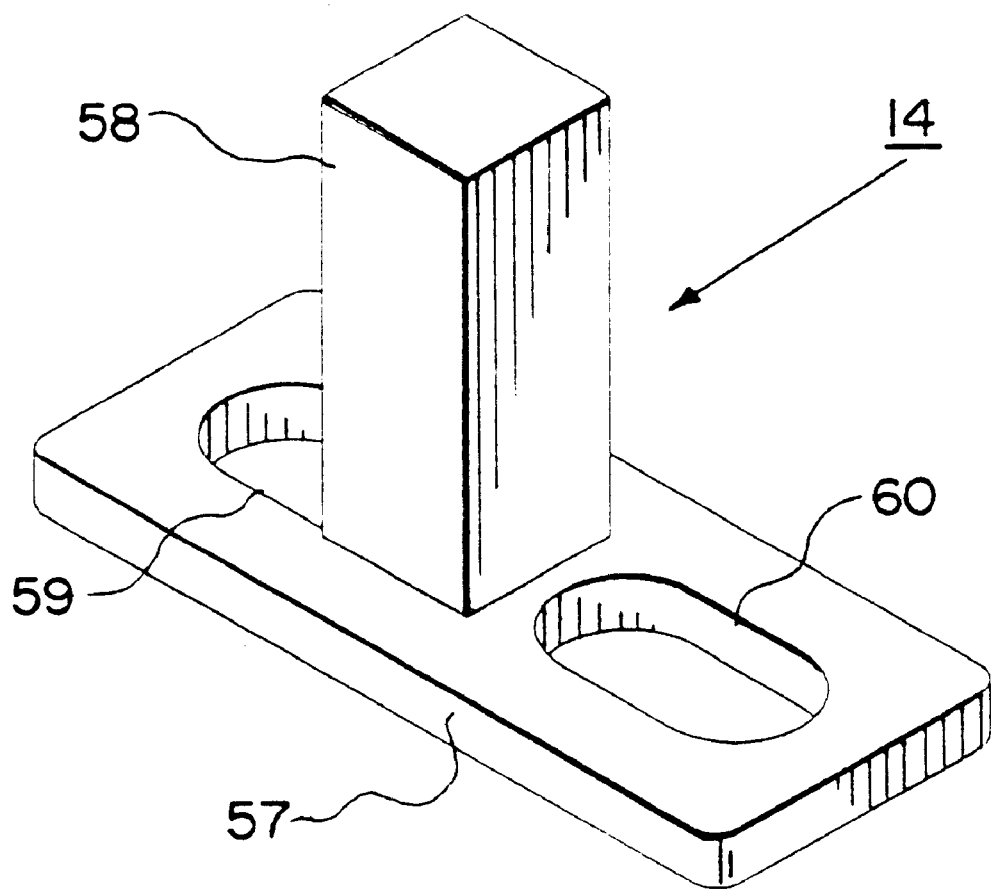
FIG. 10 is a prospective view of the spacer and extension block of the present invention.

FIG. 10 is a detailed view of the spacer and extension block 14. It consists of base 57 on which is fixedly mounted a perpendicular projecting block 58. A pair of apertures 60 and 59 are evident. These are adapted to secure the end of spring 9 and the hook portion 30 of outboard arm 31.

Operation

The operation of the coulter assembly is shown in conjunction with drawings 7, 8, 10, 11, 12 and 13.

Figure 7:
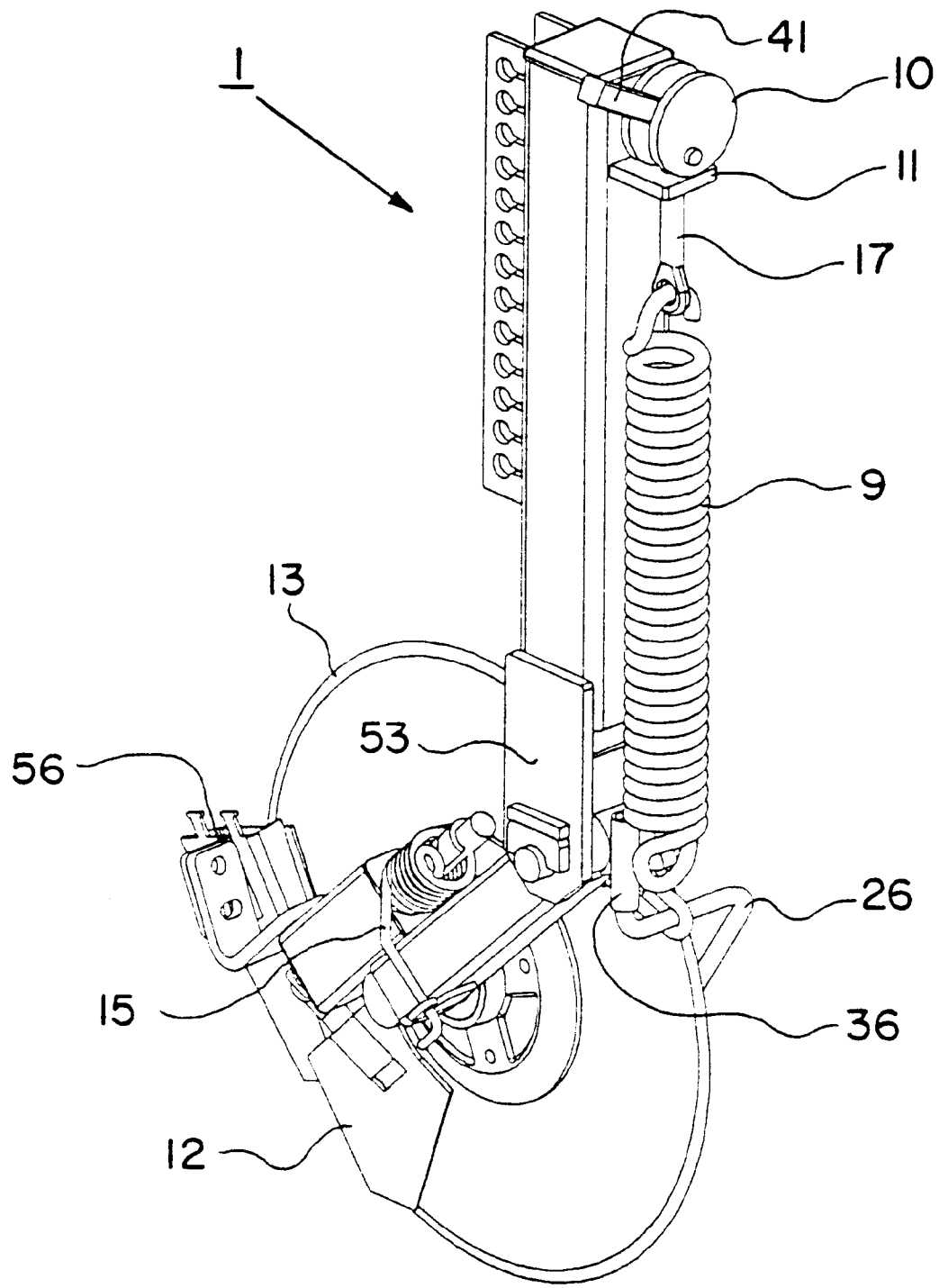
FIG. 7 is a prospective view of the coulter disk assembly of the present invention, with the lower end of the extension spring detached.

Turning to FIG. 7, one notes that the torque arm 41 has been turned upwardly, such that the eccentric axis on the eccentric rotating element or cam is downward, thus, releasing tension on tension spring 9. One notes that the bottom end of tension spring 9 has been released from the outboard arm of the strut 5.

Figure 8:
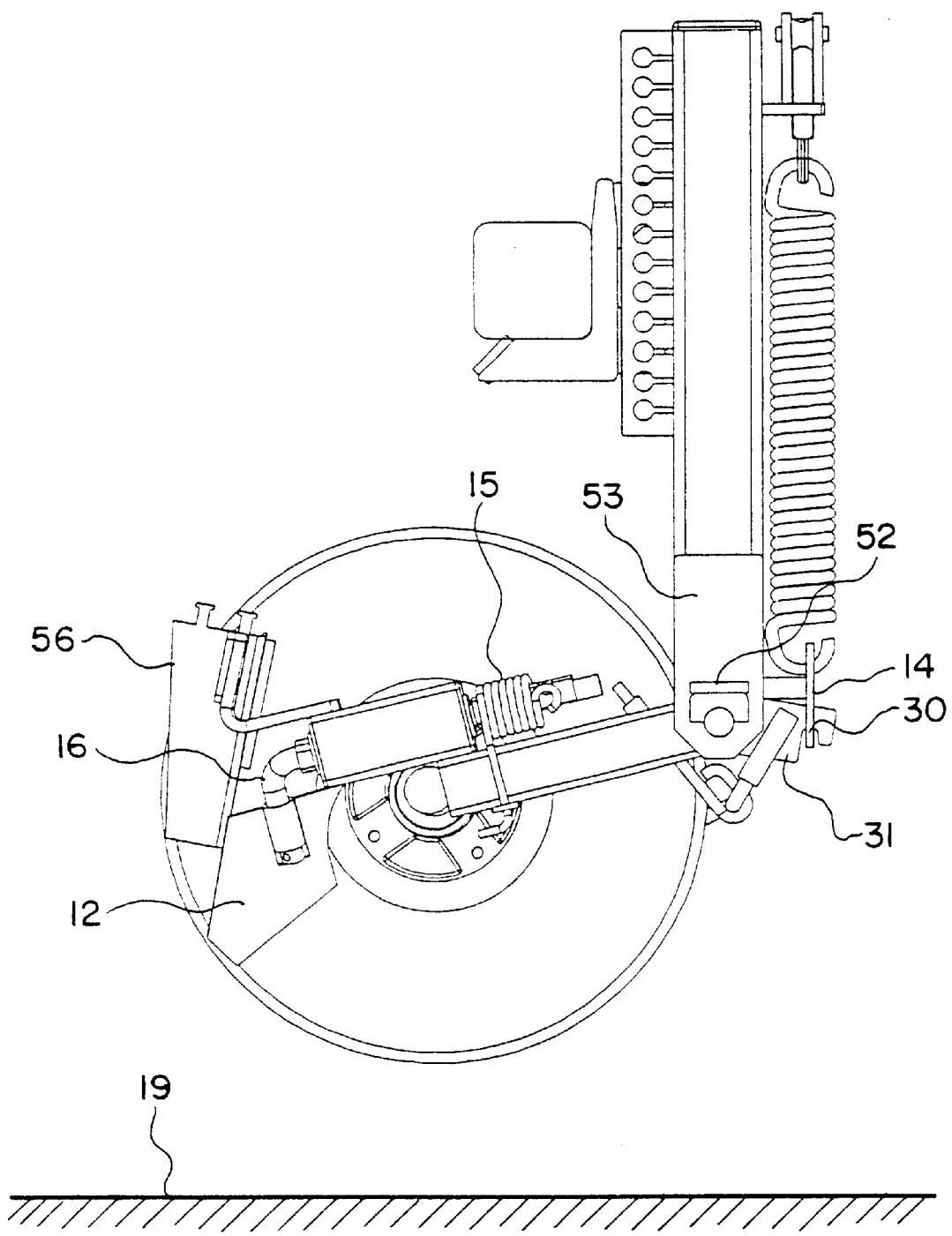
FIG. 8 is a side view of a coulter disk assembly of the present invention in the locked, raised, disabled position.

In FIG. 8, coulter disk 13 has been manually lifted. The torque arm 41 remains in an upward position and spacer 14 has been inserted into a space between outboard arm 31 of strut 5 and stop stub 53 located just below tube 50 of mounting bracket 1. Thereafter, torque arm 41 can be rotated downwardly and spring 9 locks the whole assembly into the upward position, i.e. non-operating position. One notes that the coulter 13 raises considerably above the level of the ground 19.

Figure 11:
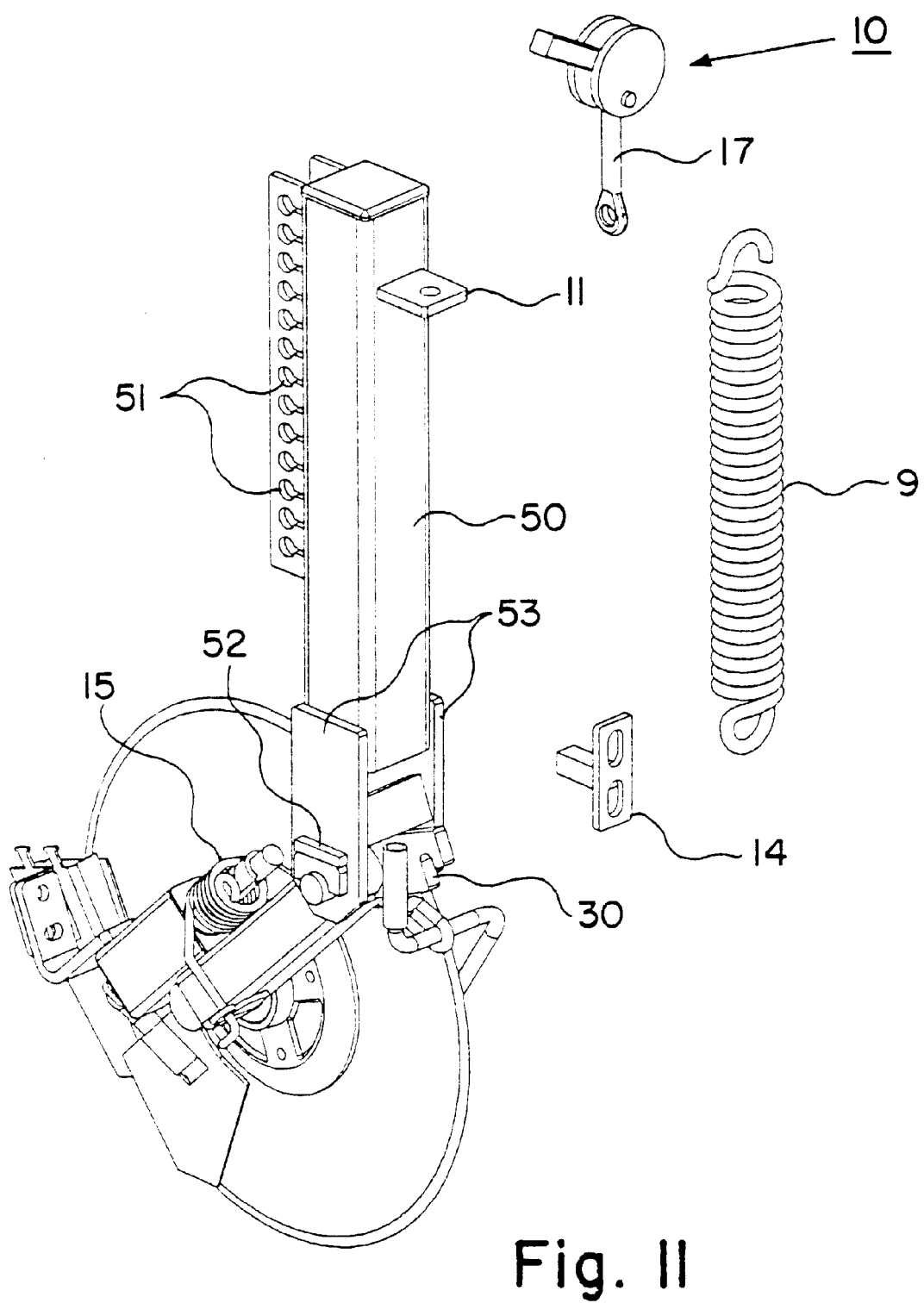
FIG. 11 is a detailed view of the major components of the present invention disabled.

FIG. 11 is a partially exploded assembly showing spring 9 and spacer block 14. The coulter, without the tension of spring 9 is in its maximum downward position.

Figure 12:
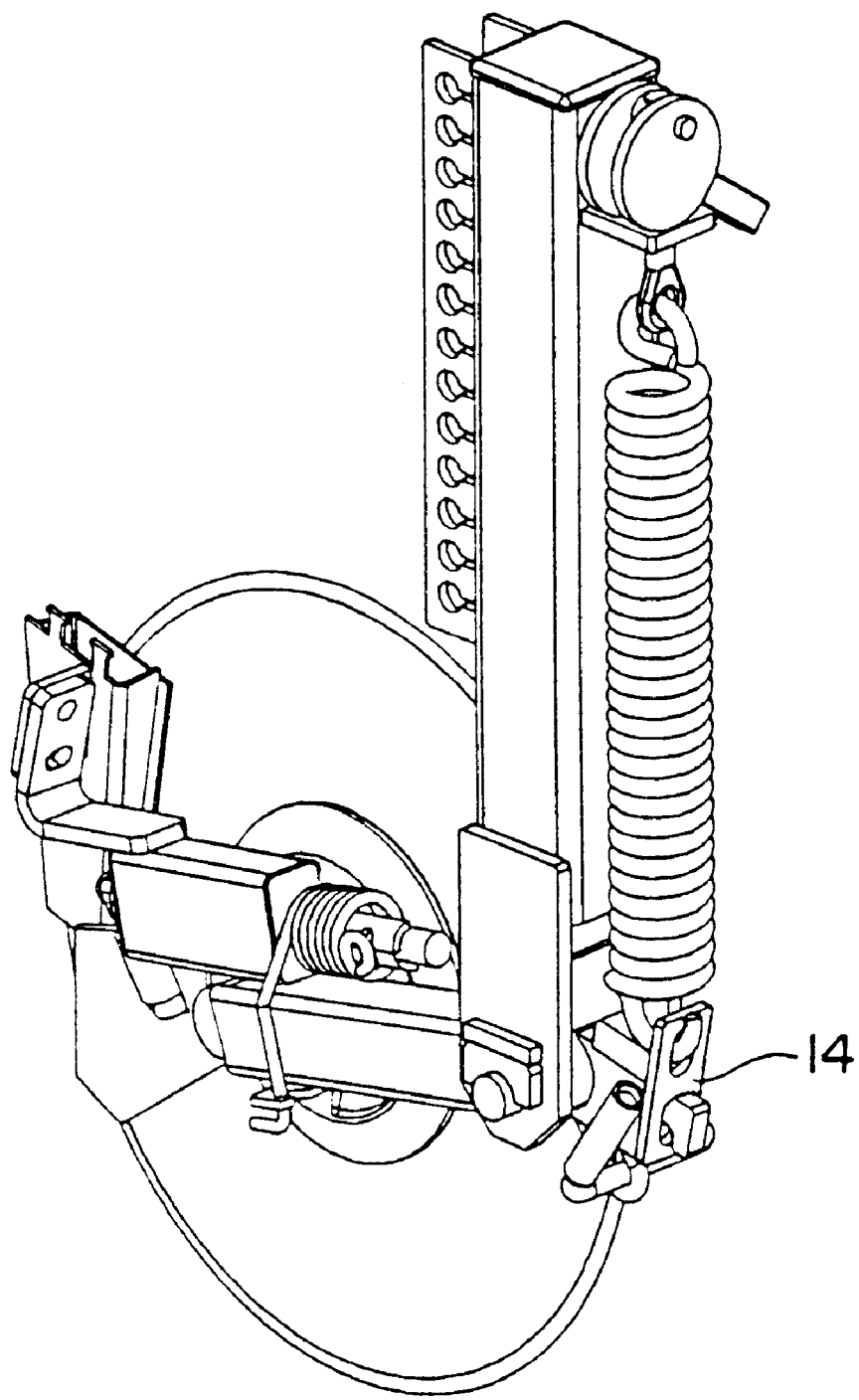
FIG. 12 is a prospective view of the coulter assembly of the present invention in the raised disabled locked position.

FIG. 12 is a similar view to the position shown in FIG. 8 with the exception that it is a perspective view. The spacer block 14 has been installed and the coulter is raised. The spring has been re-attached to hold everything securely in place. Note that the outboard arm 31 is hooked in the lower hole of the spacer block and the lever 41 has been turned downwardly to increase the tension on spring 9.

Figure 13:
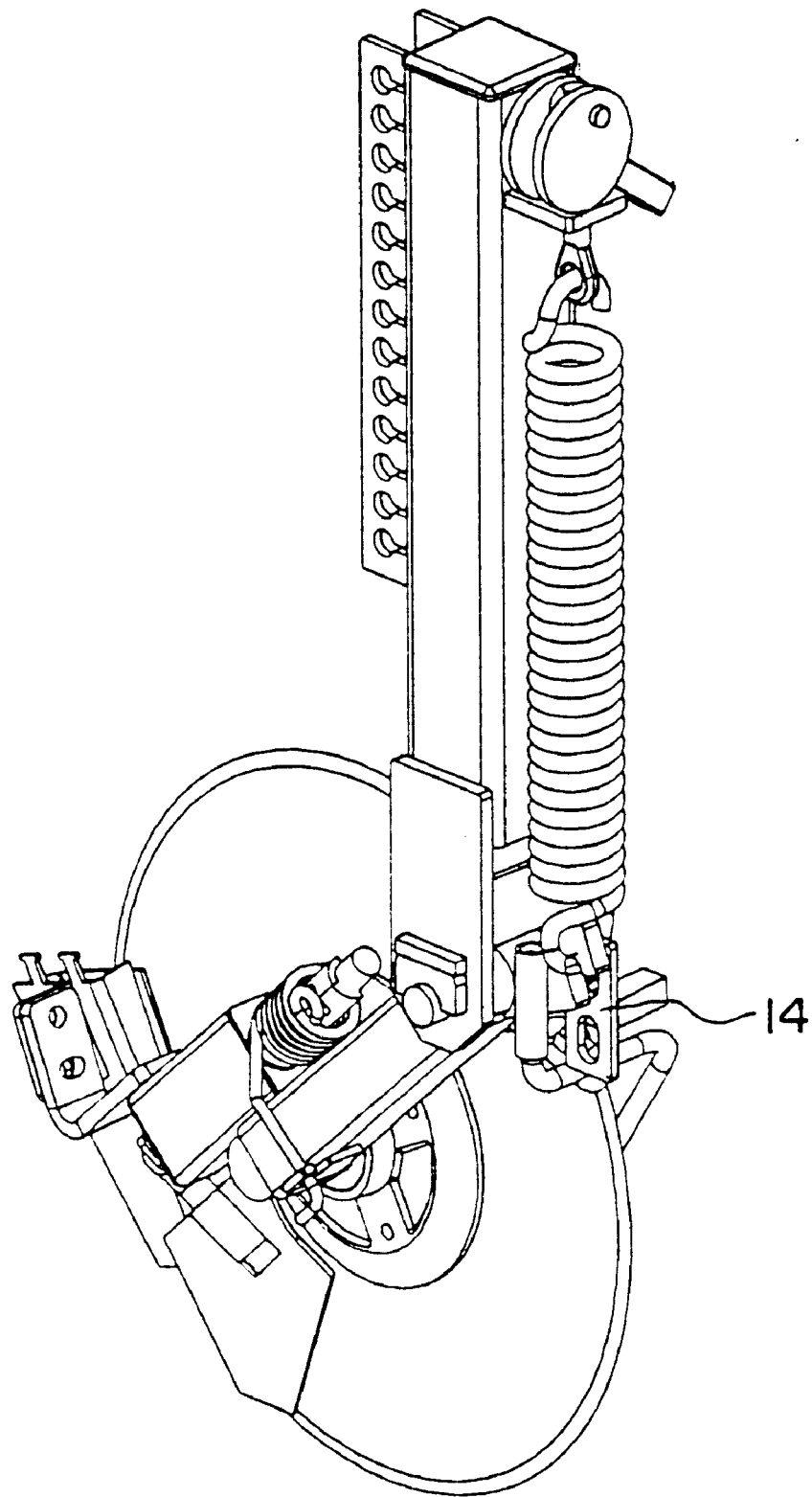
FIG. 13 is similar to FIG. 12 with the exception that the coulter assembly is in the operative, unlocked, earth engaging position.

FIG. 13 shows the coulter assembly in the operative position similar to that of FIG. 1. The bottom of spring 9 is hooked securely on outboard arm 31 while the spacer block 14 is simply hanging on the end of the spring for the purposes of storage. The eccentric element is shown to be rotated to extend the spring and it biased against the tab which guides the eye-bolt connecting the spring to a pivoting connection in the eccentric element 10.

Figure 14:
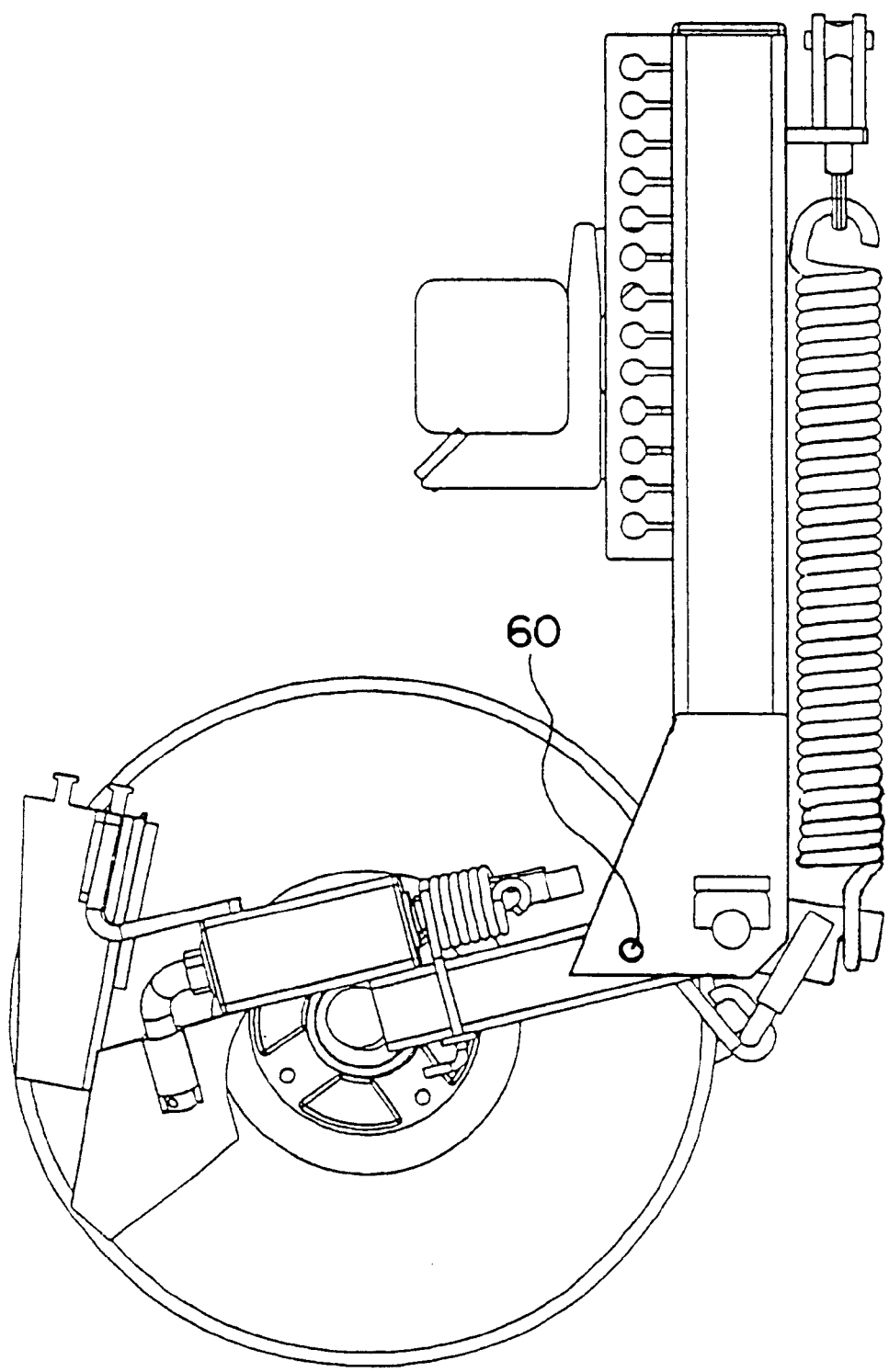
FIG. 14 shows an alternative embodiment of the invention.
Figure 15:
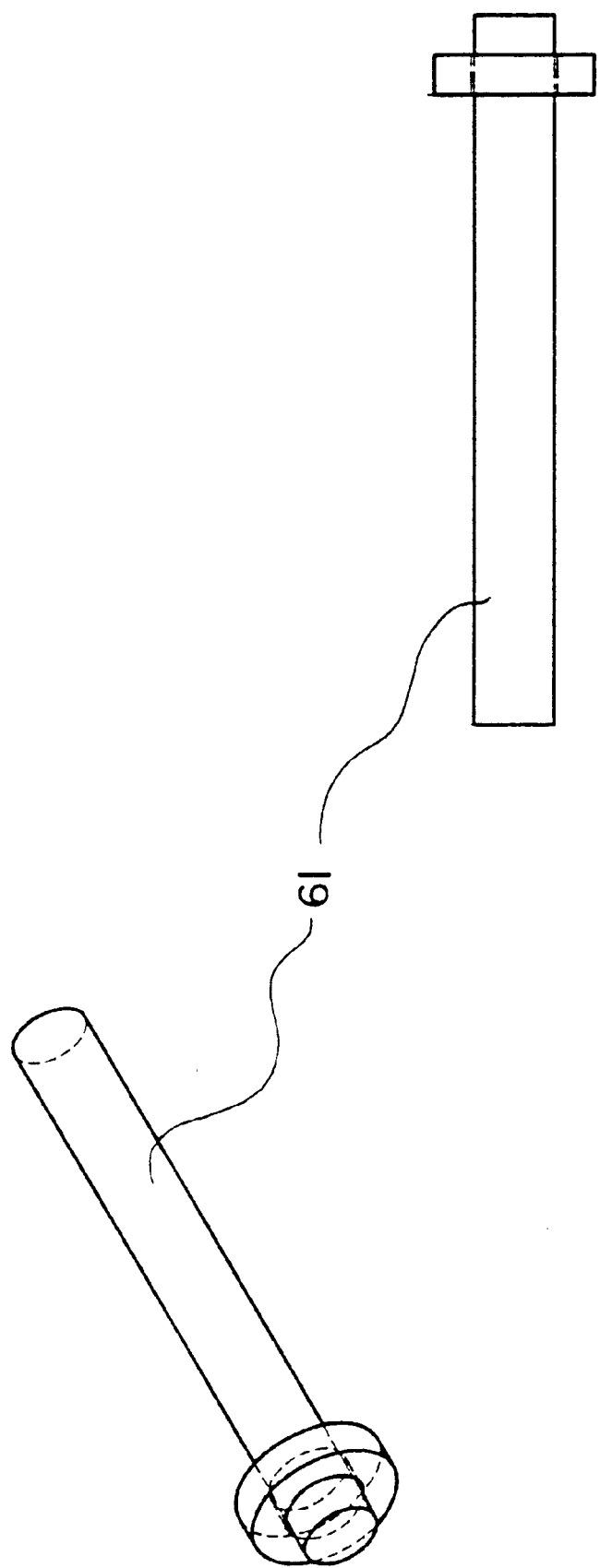
FIG. 15 shows a pin.
Figure 16:
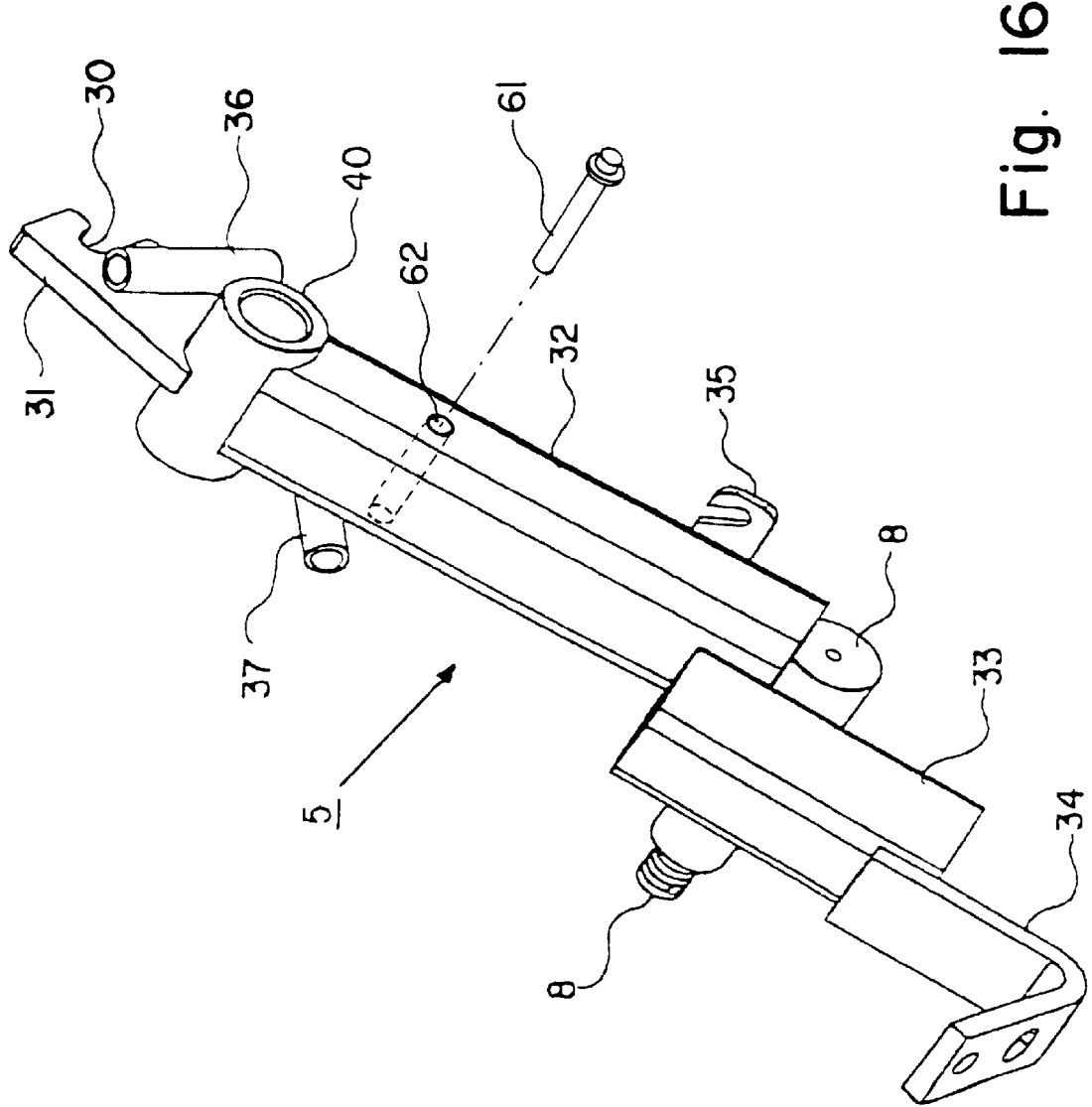
FIG. 16 shows a hole in the strut.

FIG. 14 shows the coulter assembly secured in the upward position when used with a high displacement eccentric element. Hole 60 located in mounting bracket 1 has pin 61 of FIG. 15 inserted. FIG. 16 shows strut 5 with a hole 62 for receiving pin 61.

What is claimed is:

1. A disc coulter assembly including:
   a mounting bracket attached to a toolbar;
   a disc coulter rotatable attached to a strut;
   said strut being pivotally attached to said mounting bracket, wherein said mounting bracket includes a means of limiting upward rotational motion of said strut;
   said assembly further including a rotatable eccentric element mounted on a tab;
   said tab being fixedly attached to an upper portion of said mounting bracket;
   said assembly further including a resilient means;
   an upper end of said resilient means being connected to an attachment means pivotally connected to said eccentric element; and
   a lower end of said resilient means being connected to said strut, such that in operation, when said eccentric element is rotated, a force generated by said resilient means can be removed from acting on said strut, such that said strut can easily be pivotally rotated upwardly and locked, such that said disc coulter is out of contact with the ground.

2. A disc coulter assembly including:
   a mounting bracket attached to a toolbar;
   a disc coulter rotatable attached to a strut;
   said strut being pivotally attached to said mounting bracket;
   said assembly further including a rotatable eccentric element mounted on a tab;
   said tab being fixedly attached to an upper portion of said mounting bracket;
   said assembly further including an extension spring;
   an upper end of said extension spring being connected to an eyebolt pivotally connected to said eccentric element; and
   a lower end of said extension spring being connected to said strut, such that in operation, when said eccentric element is rotated, a force generated by said resilient means can be removed from acting on said strut, such that said strut can easily be pivotally rotated upwardly and locked, such that said disc coulter is out of contact with the ground.

3. A disk coulter assembly as in claim 2 where an extension link is used to effectively increase a total non-elongated length of said extension spring to allow indirect reattachment of said extension spring to said strut.

4. A disk coulter assembly as in claim 2 wherein an extension link and spacer block are combined into one part to simultaneously allow reattachment of said extension spring and lock said strut into a position where said disk coulter is out of contact with the ground when said extension spring is elongated.

5. A disc coulter assembly including:
   a mounting bracket attached to a toolbar;
   a disc coulter rotatably attached to a strut;
   said strut being pivotally attached to said mounting bracket;
   said assembly further including a rotatable eccentric element mounted on a tab; said tab being fixedly attached to an upper portion of said mounting bracket;
   said assembly further including a resilient means;
   an upper end of said resilient means being connected to an attachment means pivotally connected to said eccentric element; and
   a lower end of said resilient means being connected to said strut, such that in operation, when said eccentric element is rotated, a force generated by said resilient means can be removed from acting on said strut, such that said strut can easily be pivotally rotated upwardly and locked, such that said disc coulter is out of contact with the ground.

6. A disk coulter assembly as in claim 5 wherein, in operation, a spacer block is adapted to be inserted between said strut and said mounting bracket to prevent said disk coulter from contacting the ground.

7. A disk coulter assembly as in claim 5 wherein said disk coulter assembly also includes scraping means, a means for pivoting said scraping means on a torque transmitting arm, a means for securing said scraping means onto said torque transmitting arm, a torsion spring to the torque transmitting arm, a means for attaching said torsion spring to said strut, a means for pivotally attaching said torque transmitting arm to said strut, and a crop input depositing tube attached to said strut.

8. A disk coulter assembly as in claim 7 wherein said scraping means include a planar member attached to a hollow circular pivot bushing to allow pivoting of said scraping means on said torque transmitting arm.

9. A disk coulter assembly as in claim 7 where said scraping means is biased by said torsion spring against said disk coulter.

10. A disk coulter assembly as in claim 7 where said scraping means is used to maintain the surface of said coulter disk upon which it acts, free and clear of all debris, past the area of contact between said scraping means and said disk coulter.

11. A disk coulter assembly as in claim 8 adapted in operation to create a slot that allows the disposition of one or several materials into the soil.

12. A disk coulter assembly as in claim 7 wherein said means for attaching said torque transmitting arm is also used to attach said crop input depositing tube.

13. A disk coulter assembly as in claim 11 where the materials deposited in said slot are seed, fertilizer, pesticide or fungicide.

14. A disk coulter assembly as in claim 5 wherein a scraping tine, pivotally attached to said mounting bracket and simultaneously pivotally attached to said strut by adjustable means, is used to keep the side of said disk coulter relatively free of soil and debris.

15. A disk coulter assembly as in claim 14 wherein said adjustable means is used to vary the force upon which said tine places on said disk coulter.

16. A disk coulter assembly as in claim 14 where said scraping tine has a circular cross section.

17. A disk coulter assembly as in claim 14 where said adjustable means is a threaded eye-bolt.

18. A disk coulter assembly as in claim 14 wherein said adjustable means is a threaded J-bolt.

19. A coulter disk assembly, adapted to be mounted on a horizontal frame element of a tool bar, and capable of being raised such that a coulter disk is out of contact with the ground;

said assembly including:
a vertically disposed mounting bracket pivotally attached to a strut on which said coulter disk is rotatably mounted;
said assembly further including a tab bracket adapted to support an eccentric element, which is adapted to secure an upper end of an extension spring;
a lower end of said spring being adapted in soil working operation to place tension on an outboard arm of said strut, thereby maintaining said coulter disk in a ground engaging position;
said assembly further including a spacer block; wherein in operation, to raise said coulter disk, an operator rotates said eccentric element, thereby releasing tension from said spring and releasing said spring, raising said coulter disk and inserting said spacer block between said mounting bracket and said strut; thereafter reinserting said spring in an upper hole of said spacer block, and inserting said outboard arm in a lower hole of said spacer block;
thereafter rotating said eccentric element to lock the assembly in an upward position.

20. A coulter assembly as claimed in claim 19 wherein said mounting bracket further includes a plurality of adjustment holes and a U-bolt and attachment bracket.

21. A coulter assembly as claimed in claim 19 further including a torsion mounted scraper assembly on an inboard side of said coulter disk and a scraper tine on an outboard side of said coulter disk.

22. A coulter assembly as claimed in claim 21 further including a granular products depositing tube.

23. A coulter assembly as claim in claim 19 wherein said eccentric element comprises a pair of disks, an offset lever arm, a pivoting connector, a receptable, and an eye-bolt; said lever arm being adapted to receive an extension handle and being adapted to rotate said eccentric element.

24. A coulter assembly as claimed in claim 19 wherein said spacer block comprises a plate with an upper and lower aperture and a perpendicularly extending block or pin.

25. A method of raising a coulter disk out of ground engagement comprising the steps of:
(1) rotating an eccentric element to a lever up position;
(2) releasing tension on a spring;
(3) disconnecting a lower end of said spring from an outboard end of a strut on which said coulter disk is rotatably mounted;
(4) raising said coulter disk from the ground;
(5) inserting a spacer block between said strut and a mounting bracket;
(6) reconnecting said lower end of said spring to an upper aperture in said spacer block;
(7) reconnecting said outboard end of said strut in a lower aperture in said spacer block;
(8) rotating said eccentric element to a lever down position, thereby locking said coulter disk in an upward position.

26. A method of raising a coulter disk out of the ground engagement comprising the steps of:
(1) rotating an eccentric element to a lever up position;
(2) releasing tension on a spring;
(3) disconnecting a lower end of said spring from an outboard end of a strut on which said coulter disk is rotatably mounted;
(4) raising said coulter disk from the ground;
(5) engaging the strut against a stop to lock said strut in a position out of the ground;
(6) re-connecting said spring to said strut and rotating said eccentric element to a lever down position, thereby locking said coulter disk in an upward position.

* * * * *